US012625813B2

(12) United States Patent
Yalamarthy et al.

(10) Patent No.: US 12,625,813 B2
(45) Date of Patent: May 12, 2026

(54) SYSTEM LEVEL CACHE WITH CONFIGURABLE PARTITIONING

(71) Applicant: Arm Limited, Cambridge (GB)

(72) Inventors: Devi Sravanthi Yalamarthy, Austin, TX (US); Jamshed Jalal, Austin, TX (US); Mark David Werkheiser, Austin, TX (US); Wenxuan Zhang, Austin, TX (US); Ritukar Khanna, Austin, TX (US); Rajani Pai, San Jose, CA (US); Gurunath Ramagiri, Austin, TX (US); Mukesh Patel, Round Rock, TX (US); Tushar P Ringe, Austin, TX (US)

(73) Assignee: Arm Limited, Cambridge (GB)

( * ) Notice: Subject to any disclaimer, the term of this patent is extended or adjusted under 35 U.S.C. 154(b) by 179 days.

(21) Appl. No.: 18/109,454

(22) Filed: Feb. 14, 2023

(65) Prior Publication Data

US 2024/0273026 A1 Aug. 15, 2024

(51) Int. Cl.
*G06F 12/084* (2016.01)
*G06F 12/0811* (2016.01)
*G06F 12/0891* (2016.01)

(52) U.S. Cl.
CPC ........ *G06F 12/084* (2013.01); *G06F 12/0811* (2013.01); *G06F 12/0891* (2013.01)

(58) Field of Classification Search
CPC . G06F 12/084; G06F 12/0811; G06F 12/0891
See application file for complete search history.

(56) References Cited

U.S. PATENT DOCUMENTS

| | | | |
|---|---|---|---|
| 2015/0046656 A1* | 2/2015 | Blinick ............... | G06F 12/0848 711/129 |
| 2020/0285592 A1* | 9/2020 | Ambroladze ......... | G06F 12/128 |
| 2020/0301831 A1* | 9/2020 | Wilson ............... | G06F 12/0831 |

OTHER PUBLICATIONS

A screen shot of the page https://www.geeksforgeeks.org/introduction-to-memory-and-memory-units taken by wayback.org on Oct. 27, 2020. (Year: 2020).*
A book titled Memory Systems: Cache, DRAM, Disk by Bruce Jacob, et al., published 2008 (Year: 2008).*
An article titled Did IBM Just Preview the Future of Caches by Dr. Ian Cutress published Sep. 2, 2021 (Year: 2021).*

(Continued)

*Primary Examiner* — Janice M. Girouard
(74) *Attorney, Agent, or Firm* — Leveque Intellectual Property Law, P.C.

(57) ABSTRACT

A data processing apparatus includes one or more cache configuration data stores, a coherence manager, and a shared cache. The coherence manager is configured to track and maintain coherency of cache lines accessed by local caching agents and one or more remote caching agents. The cache lines include local cache lines accessed from a local memory region and remote cache lines accessed from a remote memory region. The shared cache is configured to store local cache lines in a first partition and to store remote cache lines in a second partition. The sizes of the first and second partitions are determined based on values in the one or more cache configuration data stores and may or not overlap. The cache configuration data stores may be programmable by a user or dynamically programmed in response to local memory and remote memory access patterns.

18 Claims, 5 Drawing Sheets

(56) References Cited

OTHER PUBLICATIONS

An article titled Enterprise-Class Multilevel Cache Design: Low Latnecy, Huge CApacity, and High Reilaibilty by Deanna Berger, et al., updated Jan. 13, 2023. (Year: 2023).*
A screen shot of an article Introduction To Memory and Memory Units taken by archive.org on Oct. 17, 2020 (Year: 2020).*
An article titled How The Cache Memory Works by Gabriel Torres, published Sep. 12, 2007 (Year: 2007).*
An article titled How can we find data in the cache? downloaded from https://courses.cs.washington.edu/courses/cse378/07au/lectures/L16-More-Cache-Organizations.pdf downloaded from archive.org on Aug. 29, 2017 (Year: 2019).*

* cited by examiner

700

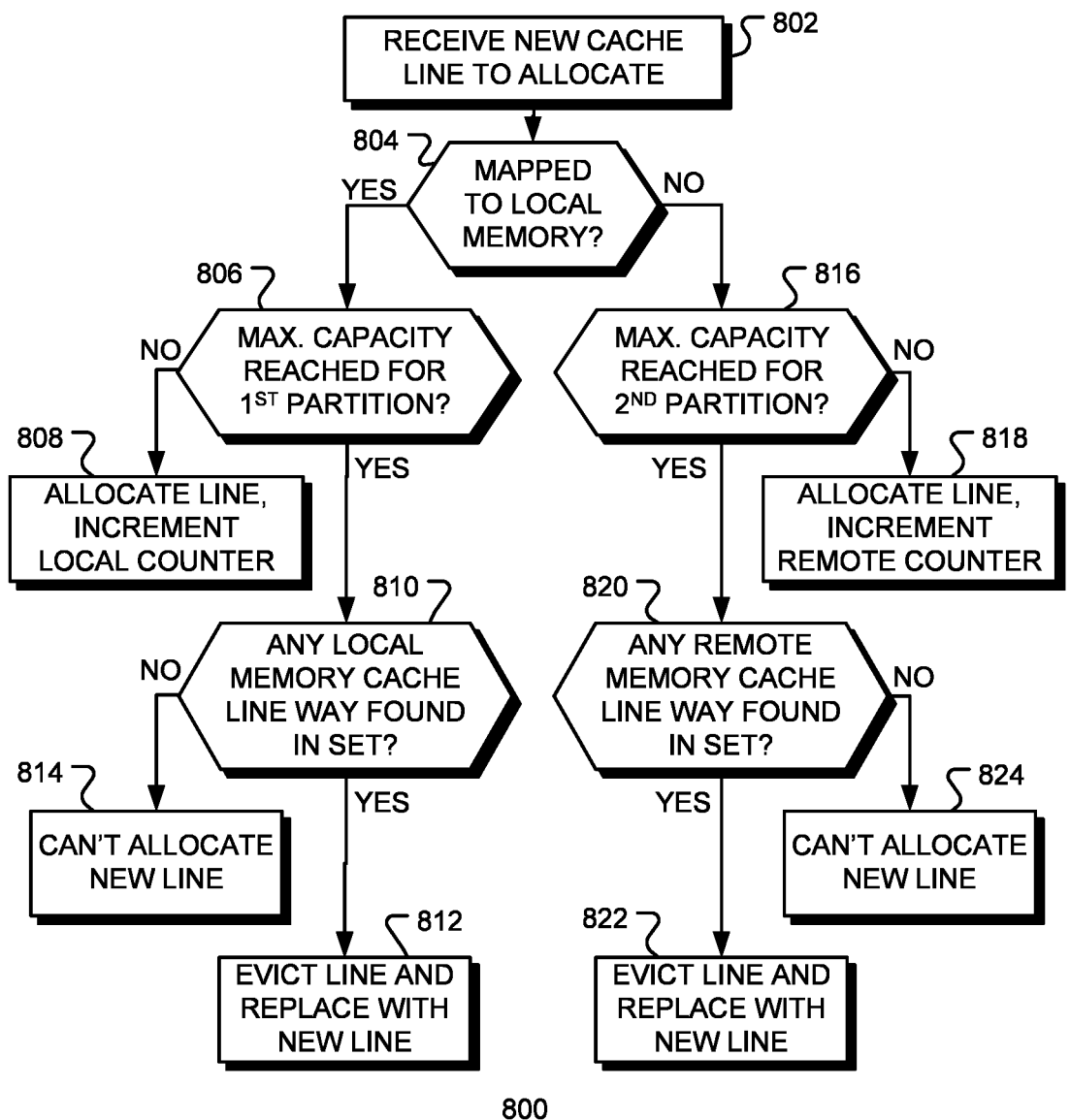

RECEIVE NEW CACHE LINE TO ALLOCATE — 802

804 — MAPPED TO LOCAL MEMORY?

YES

NO

806 — MAX. CAPACITY REACHED FOR 1ST PARTITION?

NO

808 — ALLOCATE LINE, INCREMENT LOCAL COUNTER

YES

810 — ANY LOCAL MEMORY CACHE LINE WAY FOUND IN SET?

NO

814 — CAN'T ALLOCATE NEW LINE

YES

812 — EVICT LINE AND REPLACE WITH NEW LINE

816 — MAX. CAPACITY REACHED FOR 2ND PARTITION?

NO

818 — ALLOCATE LINE, INCREMENT REMOTE COUNTER

YES

820 — ANY REMOTE MEMORY CACHE LINE WAY FOUND IN SET?

NO

824 — CAN'T ALLOCATE NEW LINE

YES

822 — EVICT LINE AND REPLACE WITH NEW LINE

SYSTEM LEVEL CACHE WITH CONFIGURABLE PARTITIONING

BACKGROUND

In a data processing system with multiple caching agents (such as processor cores and accelerators), caches may be arranged in a hierarchy in which each level of the hierarchy acts as an aggregation layer for the caches before it. A system level cache (SLC) stores local cache lines so that subsequent accesses to these lines can be retrieved from the SLC instead of being loaded from a slower memory. A snoop filter tracks cache lines accessed by each caching agent so that any subsequent accesses to these addresses by another caching agent can be easily looked up for coherency resolution.

A hierarchy of snoop filters may be used such that, for example, multiple private (L1) Data and Instruction caches are tracked at a shared L2 snoop filter and any evictions from L1 caches can be allocated to L2 caches. At the lowest level cache (L3), the snoop filter tracks all the cache lines in L1/L2 caches and evictions from L1/L2 caches can be cached in the L3 cache.

Large scale data processing systems may include multiple chips with many caching agents accessing shared memories. Accessing data via a remote chip introduces considerable latency into the system. In addition, maintaining coherency of cached data requires transmission of coherence messages between chips. As the scale of multi-chip systems increases, there is a growing need to improve the efficiency and performance of coherent data access.

BRIEF DESCRIPTION OF THE DRAWINGS

The accompanying drawings provide visual representations which will be used to describe various representative embodiments more fully and can be used by those skilled in the art to better understand the representative embodiments disclosed and their inherent advantages. In these drawings, like reference numerals identify corresponding or analogous elements.

FIG. 8 is a flow chart of another computer-implemented method, in accordance with various representative embodiments.

DETAILED DESCRIPTION

Figures 1, 2:
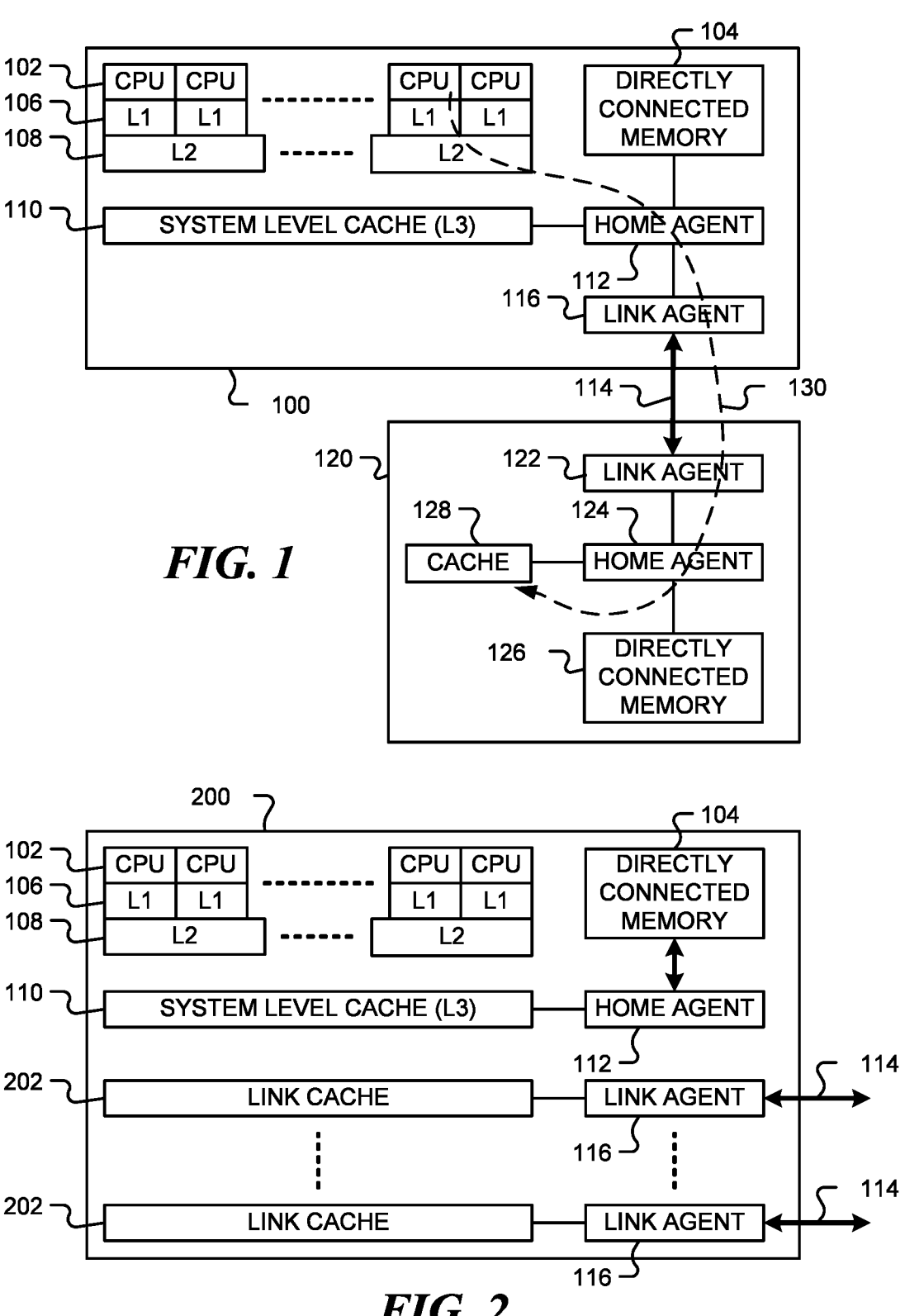
FIG. 1 is a block diagram of a multi-chip data processing system.
FIG. 2 is a block diagram of a further multi-chip data processing system.

The various apparatus and devices described herein provide mechanisms for cache sharing in a data processing apparatus. In particular, configurable partitioning of a shared cache is disclosed.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

FIG. 1 is a simplified block diagram of a multi-chip data processing system that includes first chip 100 and second chip 120. First chip 100 includes one or more central processing unit (CPU) cores 102 that access data in a shared, directly coupled, memory 104. CPUs 102 have private (level one or L1) caches 106 and level two (L2) caches 108 may be shared between multiple CPUs in a cluster. A system level cache (SLC) 110 may be a level three (L3) cache. The caches are used as temporary stores for data from recently accessed memory addresses, so that any subsequent accesses to these addresses can be serviced without accessing memory again. Under an exclusive cache policy, a SLC is used to store data evicted from the L1/L2 caches. In an inclusive cache policy, L2 caches hold a subset of data in the SLC, and L1 caches hold a subset of data in the L2 caches. Herein, an L1 cache is referred to as the highest-level cache. Thus, L1 is higher than L2, and L2 is higher than L3. A cache on a remote device may be considered a level four (L4) cache.

A caching agent may be any device that stores and serves data from a cache. For example, CPUs 102 may be caching agents for L1 caches 106 in FIG. 1 and are local caching agents for first chip 100.

Home agent 112 acts as a point of coherency (PoC) and point of serialization (POS) for accesses to directly coupled memory 104 by local and remote caching agents.

Accesses by local caching agents to remote memory over chip-chip link 114 are handled by link agent 116. In the example shown, remote device 120 includes corresponding link agent 122 and home agent 124 that accesses remote memory 126 and local cache 128.

When a CPU on chip 100 seeks to access data associated with remote memory 126, a request bound for remote memory, indicated by arrow 130, goes through four layers of the cache hierarchy—L1/L2/SLC (L3) and finally remote cache 128 or remote memory 126. The remote cache 128 may be considered a level four (L4) cache. Thus, remote memory accesses have greater latency than local memory accesses.

FIG. 2 is a simplified block diagram of a further multi-chip data processing system. When scaling to large multi-chip systems with many caching agents, there is a growing need to cache remote lines locally so that caching agents do not have to incur increased latencies going to remote caches or memories. One way to do this is to use an explicit local cache for remote lines as shown in FIG. 2. In FIG. 2, host chip 200 includes one or more link caches 202 that store local copies of caches lines from remote memory. The cache lines are retrieved over corresponding links 116. While this approach reduces latency for remote memory accesses when a hit occurs in one of the link caches 202, the physical area of the chip is significantly increased. In addition, the approach is not efficient since the link cache might not be fully utilized when there is little or no remote traffic from a local caching agent.

In accordance with embodiments of the disclosure, an apparatus includes one or more cache configuration data stores (such as registers, for example), a plurality of local caching agents, a coherence manager and a shared cache. The coherence manager is configured to track and maintain coherency of cache lines accessed by each local caching agent and one or more remote caching agents. The cache lines include local cache lines accessed from a local memory region and remote cache lines accessed from a remote memory region. The shared cache is configured to store local cache lines in a first partition and to store remote cache lines in a second partition, where sizes of the first and second partitions are determined based on one or more values stored in the one or more cache configuration data stores. The cache configuration data stores may be registers programmable by user software or dynamically programmed in response to local memory and remote memory access patterns. The cache configuration data stores indicate a size, maximum size or minimum size of the first partition, for example. Alternatively, one register may indicate a maximum size of the first partition while another register indicates a maximum size of the second partition.

The shared cache may be a system level cache. The caching agents may be level one (L1) and level two (L2) caching agents, with the shared cache being a level three (L3) cache.

The apparatus may also include an eviction control register and a cache controller configured to evict cache lines from the shared cache based on an eviction policy, where eviction of remote cache lines from the shared cache to a level four (L4) cache memory is enabled or disabled based on a content of the eviction control register.

It is emphasized that allocation of a cache line in a partition of the shared cache is based on the source of the cache line. I.e., whether it is from a local memory region or a remote memory region. In contrast, prior cache partitioning has been based on the destination (application or thread, for example) of the cache line.

Figure 3:
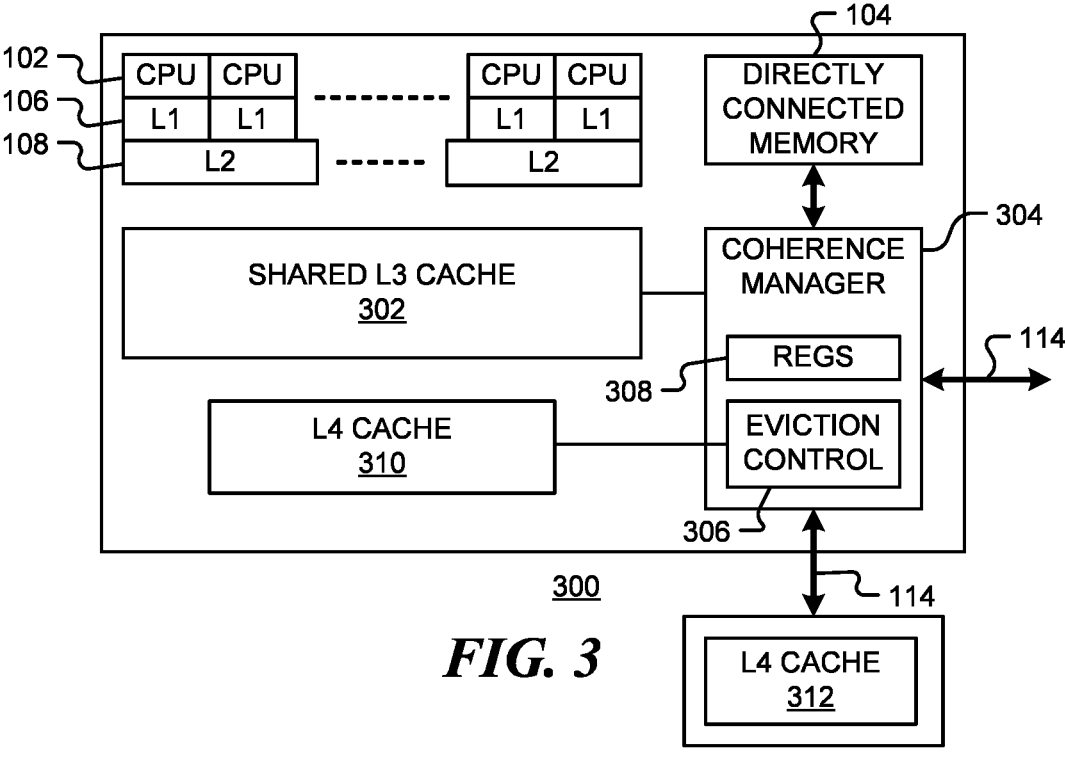
FIG. 3 is a block diagram of a data processing apparatus, in accordance with various representative embodiments.

FIG. 3 is a block diagram of a data processing apparatus 300, in accordance with various representative embodiments of the present disclosure, in which a shared cache 302 is provided for caching both local and remote cache lines. Shared cache 302 includes a fast random-access memory and an associated cache controller. Coherency resolution for both local and remote cache lines is managed by coherence manager 304, which includes a snoop filter.

Shared cache 302 may be statically partitioned between local and remote cache lines. For example, 50% of the shared cache could be reserved for local cache lines and 50% reserved for remote cache lines. While this is efficient in some situations, if there is no remote traffic for a certain period, 50% of the shared cache is unused while local lines will be evicted from the cache when the local partition reaches maximum capacity. Furthermore, if the eviction of the local line from the shared cache is an L3 line it could impact overall system performance for certain configurations or traffic patterns.

In accordance with and embodiment of the disclosure, configurable partitioning of a shared system level cache between local and remote cache lines is provided. This enables both categories of cache lines to reach their maximum allowed capacity without hurting overall throughput of the system and maximizes the usage of the shared cache for various traffic patterns. A partition may be a portion of the shared cache or all of the shared cache. The latter case enables a category to occupy all of the shared cache in the absence of other traffic.

Coherence manager 304 may include eviction controller 306 that accesses eviction control registers 308 and controls eviction of cache lines from shared L3 cache 302. Cache lines evicted from the cache may be allocated to local L4 cache 310 or remote L4 cache 312.

In addition, the shared cache may be configured to allow or disallow level four (L4) cache allocations.

The configurability may be implemented using programmable cache configuration data stores 310. This approach enables dynamic reconfiguration of the shared cache based on traffic patterns or use cases.

TABLE 1 shows some example partitions of a shared cache.

TABLE 1

| Example partitioning | |
| --- | --- |
| % Local memory cache lines | % Remote memory cache lines |
| 75 | 25 |
| 50 | 50 |
| 25 | 75 |
| 100 | 0 |

Figure 4:
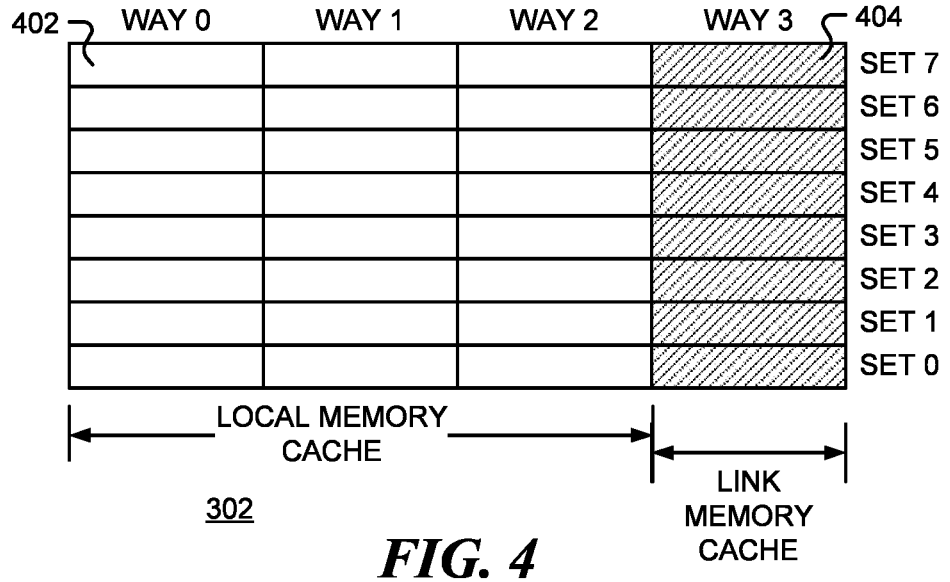
FIGS. 4-6 show example partitions of a shared cache, in accordance with various representative embodiments.

FIG. 4 shows an example partitioning where the shared cache 302 is partitioned 75/25 between local and remote cache lines, in accordance with various representative embodiments. In this simple example, cache 302 is a set associative cache. Cache ways 0-2 form first partition 402 that is reserved for local memory cache lines. Cache way 3 forms a second partition 404 that is reserved for remote memory cache lines. This approach is particularly useful when traffic patterns can be predicted. Again, the partitioning can be changed dynamically in anticipation of upcoming traffic patterns.

Figure 5:
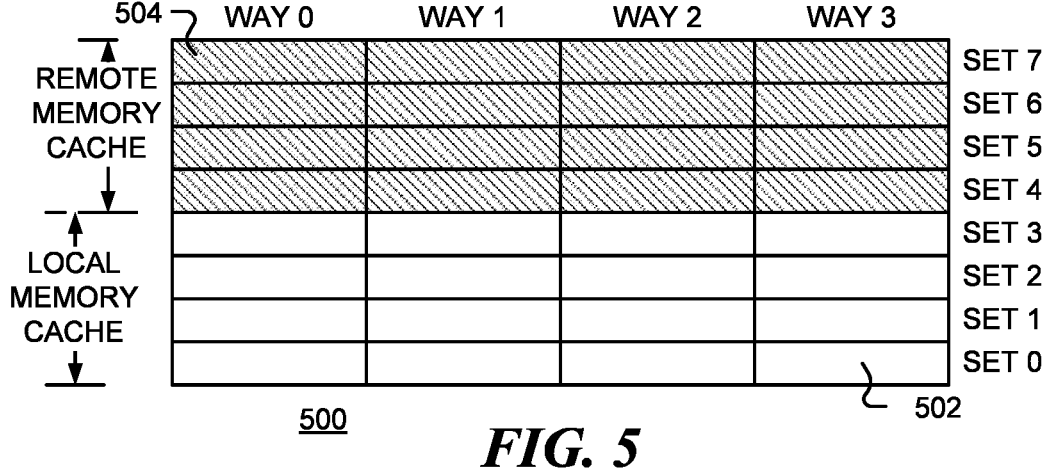

FIG. 5 shows a further example partitioning, in accordance with various representative embodiments. In this example, the shared cache is partitioned by sets rather than by ways. The cache is partitioned 50/50 between local and remote cache lines. Sets 0-3 form first partition 502 that is reserved for local memory cache lines. Sets 4-7 form a second partition 504 that is reserved for remote memory cache lines.

When traffic patterns are less predictable, one of the partitions may be underutilized while the other is at maximum capacity, leading to evictions. This is inefficient usage of cache resource because the unnecessary evictions can impact overall system performance.

In a further embodiment, the maximum cache capacity partitioning configuration can be allowed to oversubscribe and go more than a 100% capacity between local and remote lines together. This results in an overlap of the first and second partitions.

TABLE 2 shows some example configurations of a shared cache. In this example, the maximum allowable capacity for each partition is selected.

TABLE 2

| % Local memory cache lines | % Remote memory cache lines |
| --- | --- |
| 75 | 50 |
| 75 | 75 |
| 50 | 75 |
| 100 | 100 |

For example, with 100/100 configuration for local and remote lines, during the absence of remote lines, local lines can fully utilize the entire cache resource, while also giving up the cache dynamically to new remote line allocations. This approach uses the cache resource efficiently, while still allowing cache sharing.

Figure 6:
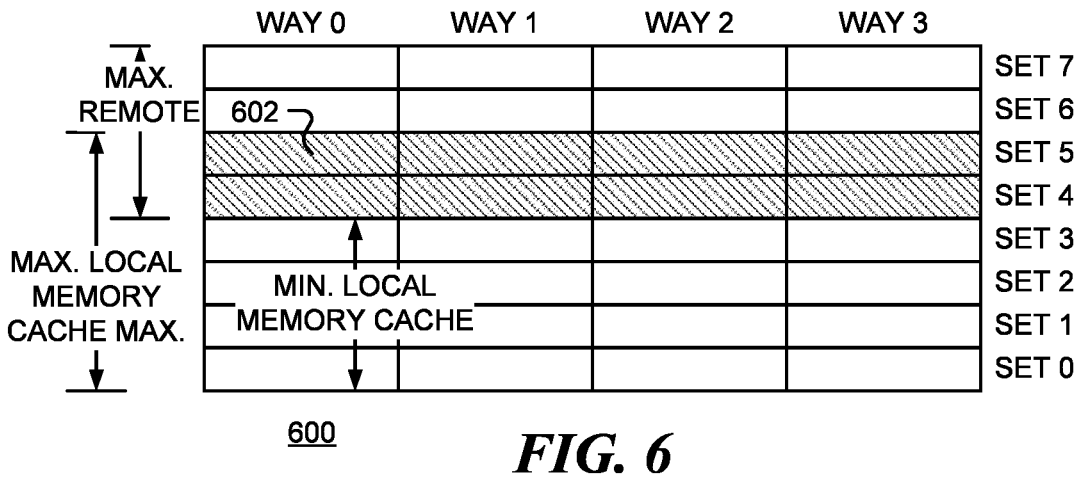

FIG. 6 shows an example where the shared cache 302 is partitioned with over-lapping regions, in accordance with various representative embodiments. Local memory cache lines can be allocated in 75% of the cache (sets 0-5) while remote memory cache lines can be allocated in 50% of the cache (sets 4-7). Overlap region 602 (sets 4 and 5) can be used for local or remote caches lines. The partitioning can be changed dynamically based on observed or predicted traffic patterns. In an equivalent embodiment, the cache configuration data stores indicate the maximum and minimum cache regions that can be allocated for local memory cache lines.

While FIGS. 4-6 show a shared cache with 4 ways and 8 sets (and an unspecified number of blocks in each set), the shared cache may have any size, arranged with any number of ways and sets. For example, a 4 MB cache may have 64 Bytes in each cache line and lines may be allocated in 16 ways.

The shared cache may be partitioned in other manners. For example, partitions may not consist of contiguous lines, way or sets, but may be distributed across the cache.

In a further embodiment, the coherence manager is configurable to allow or disallow L4 allocations to the SLC, thus avoiding contention with L3 allocations for local memory lines. This configurability enables the same number of cache levels across the system, independent of local or remote memory caching, for homogeneous configurations or allows L4 allocations for heterogeneous configurations, where remote memory latencies are much larger than L4 hit latencies. This enables the system to be optimized for overall system performance or for a particular use case.

TABLE 3 summarizes example performance measurements for systems, simulated with and without a configurable partitioned shared cache, for three common benchmark applications. The simulated data processing system is a cloud datacenter that includes a 6×6 mesh network with two integrated circuit chiplets with 32 cores per chiplet and a 32 MB shared cache per chiplet. Both local and remote partitions are configured to 100/100 to fully utilize the shared cache.

The 505.mcf benchmark is based on a commercial minimum cost flow (MCF) program designed to schedule vehicles transitioning between the end of one route and the start of another route. The 520.omnetpp benchmark performs discrete event simulation of a large 10 gigabit Ethernet network. The 557.xz benchmark performs data compression.

As shown in TABLE 3, for cache and memory intensive workloads, there is a fair share usage of shared cache between local and remote lines. The results also indicate a performance gain when L4 allocations are disallowed.

TABLE 3

| | % shared cache usage with L4 Allocations | | % shared cache usage without L4 Allocations | | |
|---|---|---|---|---|---|
| Performance Benchmark | Local Memory Cache lines | Remote Memory Cache lines | Local Memory Cache lines | Remote Memory Cache lines | Perfor- mance Gain |
| 505.mcf | 56 | 38 | 45 | 49 | 0.60% |
| 520.omnetpp | 57 | 39 | 50 | 46 | 7.60% |
| 557.xz | 49 | 39 | 45 | 42 | 1.80% |

Performance Examples.

The disclosed configurable shared cache allows for efficient sharing of the cache between local and remote memory lines, while also allowing dynamic configuration of the cache partitioning based on traffic patterns. In addition, the disclosed mechanism provides an ability to allow or disallow a cache line to allocate to a level four (L4) case, based on the system configuration and use case.

An embodiment of the disclosure provides a computer-implemented method including reading values of one or more cache configuration data stores and configuring, based at least in part on the values of the one or more cache configuration data stores, a shared cache to have a first partition and a second partition. Local cache lines, accessed by local caching agents or a remote caching agent, are stored in the first partition of the shared cache, while remote cache lines accessed by the local caching agents are stored in the second partition of the shared cache. The cache lines may be stored when accessed or when evicted from a higher-level cache. Tracking and maintaining coherence of local and remote cache lines may be controlled by a coherence manager that includes a snoop filter and a cache controller.

The cache configuration data stores may be programmed in response to execution of user programming instructions or programmed dynamically in response to monitored access patterns of local memory and remote memory.

Figure 7:
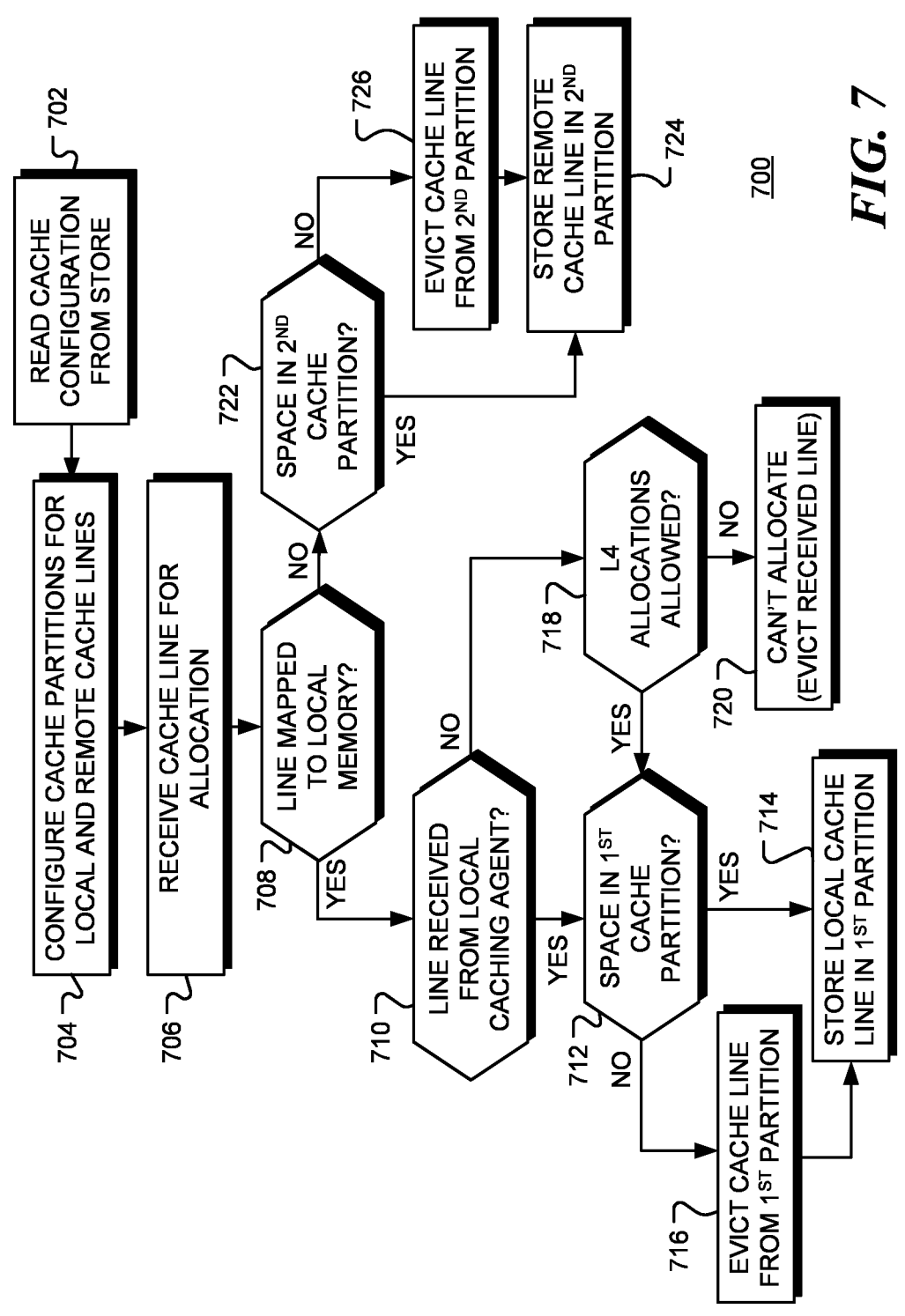
FIG. 7 is a flow chart of a computer-implemented method, in accordance with various representative embodiments.

FIG. 7 is a flow chart of a computer-implemented method 700, in accordance with various representative embodiments. Referring to FIG. 7, values are read from one or more cache configuration data stores at block 702. At block 704, a shared cache is configured to have a first partition for storing local cache lines and a second partition for storing remote cache lines. At block 706, a cache line is received for allocation in the shared cache. The line may be received in response to one or more local caching agents, or a remote caching agent, accessing a local cache line mapped to a local memory, or a local cache agent accessing a remote cache line mapped to a remote memory. Under an inclusive cache policy, accessed cache lines may be written to the shared cache when accessed. Under an exclusive cache policy, accessed cache lines may be written to the shared cache when evicted from higher level caches. If the cache line to be allocated is mapped to local memory, as depicted by the positive branch from decision block 708, flow continues to decision block 710. If the line was received from a local caching agent and there is space in the first partition of the shared cache, as depicted by the positive branches from decision block 710 and decision block 712, the cache line is stored in the first partition of the shared cache at block 714. If the line was received from a local caching agent but there is no space in the first partition of the shared cache, as depicted by the positive branch from decision block 710 and the negative branch from decision block 712, a cache line is evicted from the first partition of the shared cache at block 716 before the received cache line is stored in the first partition at block 714. When the line was not received from a local caching agent, as depicted by the negative branch from decision block 710 flow continues to decision block 718. If L4 allocations are allowed, as depicted by the positive branch from decision block 718, flow continues to block 712, otherwise, when L4 allocation are not allowed, no allocation can be made, as depicted by block 720, and the received line is evicted. If the cache line to be allocated is mapped to remote memory, as depicted by the negative branch from decision block 708, flow continues to decision block 722. At decision block 722, it is determined is there is any space in the second partition of the shared cache. If there is space, as depicted by the positive branch from decision block 722, the remote cache line is stored in the second partition of the shared cache at block 724. If there is not space, as depicted by the negative branch from decision block 722, a line is evicted from the second partition at block 726 before the cache line is stored in the second partition at block 724.

FIG. 8 is a flow chart of a computer-implemented method 800, in accordance with various representative embodiments. Referring to FIG. 8, at block 802 a cache line is received for allocation in a shared cache. If the cache line to be allocated is mapped to local memory, as depicted by the positive branch from decision block 804, the cache line is to be allocated in a first partition of the shared cache, and flow continues to decision block 806. If maximum capacity has not been reached for the first partition, as depicted by the negative branch from decision block 806, a line is allocated in the first partition at block 808 and an allocation counter for the first partition is incremented. If maximum capacity has been reached for the first partition, as depicted by the positive branch from decision block 806, flow continues to decision block 810. The cache line can only be stored in the designated set of the cache and only in a way of that set that is designated for local cache lines. If a local cache line is present in a way of the set designated for local cache lines, as depicted by the positive branch from decision block 810, the cache line is evicted at block 812 and replaced by the new cache line. If, however, no local cache line is present in any way of the set designated for local cache lines, as depicted by the negative branch from decision block 810, the new cache line cannot be allocated, as indicated by block 814.

If the cache line to be allocated is mapped to remote memory, as depicted by the negative branch from decision block 804, the cache line is to be allocated in a second partition of the shared cache, and flow continues to decision block 816. If maximum capacity has not been reached for the second partition, as depicted by the negative branch from decision block 816, a line is allocated in the second partition at block 818 and an allocation counter for the second partition is incremented. If maximum capacity has been reached for the second partition, as depicted by the positive branch from decision block 816, flow continues to decision block 820. If a remote cache line is present in a way of the set designated for remote cache lines, as depicted by the positive branch from decision block 820, the cache line is evicted at block 822 and replaced by the new cache line. If, however, no remote cache line is present in any cache way of the set designated for remote cache lines, as depicted by the negative branch from decision block 820, the new cache line cannot be allocated, as indicated by block 824.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transitory computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

The embodiments described herein are combinable.

In one embodiment, an apparatus having one or more cache configuration data stores, a plurality of local caching agents, a coherence manager configured to track and maintain coherency of cache lines accessed by each local caching agent and one or more remote caching agents, the cache lines including local cache lines accessed from a local memory region and remote cache lines accessed from a remote memory region and a shared cache configured to store local cache lines in a first partition and to store remote cache lines in a second partition, where sizes of the first and second partitions are determined based on one or more values stored in the one or more cache configuration data stores.

In another embodiment, the apparatus where the one or more cache configuration data stores are programmable by one or more user programming instructions.

In a further embodiment, the apparatus where the one or more cache configuration data stores are dynamically programmed in response to local memory and remote memory access patterns.

In another embodiment, the apparatus where the one or more cache configuration data stores indicate a size, maximum size or minimum size of the first partition.

In another embodiment, the apparatus where a first register of the one or more cache configuration data stores indicates a maximum size of the first partition and a second register of the one or more cache configuration data stores indicates a maximum size of the second partition.

In a further embodiment, the apparatus where the shared cache is a system level cache.

In another embodiment, the apparatus where the caching agents includes level one (L1) and level two (L2) caching agents.

In another embodiment, the apparatus where the shared cache memory includes a level three (L3) cache, further having an eviction control register and a cache controller configured to evict cache lines from the L3 cache based on an eviction policy, where the eviction of remote cache lines from the shared cache to a level four (L4) cache memory is enabled or disabled based on a content of the eviction control register.

In a further embodiment, the apparatus where the L4 cache memory includes a remote cache memory.

In another embodiment, a computer-implemented method having reading values of one or more cache configuration data stores, configuring, based at least in part on the values of the one or more cache configuration data stores, a shared cache to have a first partition and a second partition, accessing, by one or more local caching agents or a remote caching agent, local cache lines from a local memory, accessing, by the one or more local caching agents, remote cache lines from a remote memory, storing the local cache lines in the first partition of the shared cache and storing the remote cache lines in the second partition of the shared cache.

In another embodiment, the computer-implemented method further having storing a local cache line in the first partition of the shared cache when the local cache line is evicted from a local cache at a higher level than the shared cache and storing a remote cache line in the second partition of the shared cache when the remote cache line is evicted from a local cache at a higher level than the shared cache.

In a further embodiment, the computer-implemented method further having tracking and maintaining coherency of local and remote cache lines by a coherence manager.

In another embodiment, the computer-implemented method further having programming the one or more cache configuration data stores responsive to execution of one or more user programming instructions.

In another embodiment, the computer-implemented method further having monitoring access patterns of local memory and remote memory and dynamically programming the one or more cache configuration data stores in response to the access patterns.

In a further embodiment, the computer-implemented method further having setting a size, maximum size or minimum size of the first partition based, at least in part, on values of the one more cache configuration data stores.

In another embodiment, the computer-implemented method further having setting a maximum size of the first partition based, at least in part, on a value of a first cache configuration data store of the one or more cache configuration data stores and setting a maximum size of the first partition based, at least in part, on a value of a first cache configuration data store of the one or more cache configuration data stores.

In another embodiment, the computer-implemented method where the local caching agents include L1 and L2 caching agents.

In a further embodiment, the computer-implemented method further having reading a value of an eviction control register and evicting a remote cache line from the shared cache enabling storage of the evicted remote cache line in a level four (L4) cache when the value of the eviction control register has a first value and disabling storage of the evicted remote cache line in the L4 cache when the value of the eviction control register has a second value.

In another embodiment, the computer-implemented method where the L4 cache includes a remote cache memory.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A multi-chip data processing system comprising:
   a first chip directly coupled to a first memory, where the first memory is a local memory of the first chip;
   a second chip directly coupled to a second memory, where the second memory is a remote memory of the first chip; and
   a chip-chip link that couples between the first chip and the second chip;
   where the first chip includes:
   one or more cache configuration data stores;
   a plurality of local caching agents;
   a coherence manager configured to track and maintain coherency of cache lines including:
   local cache lines accessed by one or more local caching agents of the plurality of local caching agents or accessed via a chip-chip link by one or more remote caching agents, where the local cache lines are mapped to addresses in the local memory of the first chip; and remote cache lines accessed by one or more local caching agents of the plurality of local caching agents, where the remote cache lines are mapped to addresses in the remote memory of the first chip; and a shared cache, shared between the plurality of local caching agents, configured to store local cache lines in a first partition and to store remote cache lines in a second partition, where sizes of the first and second partitions are determined based on one or more values stored in the one or more cache configuration data stores.

2. The multi-chip data processing system of claim 1, where the one or more cache configuration data stores are programmable by one or more user programming instructions.

3. The multi-chip data processing system of claim 1, where the one or more cache configuration data stores are dynamically programmed in response to local memory and remote memory access patterns.

4. The multi-chip data processing system of claim 1, where the one or more cache configuration data stores indicate a size, maximum size or minimum size of the first partition.

5. The multi-chip data processing system of claim 1, where a first register of the one or more cache configuration data stores indicates a maximum size of the first partition and a second register of the one or more cache configuration data stores indicates a maximum size of the second partition.

6. The multi-chip data processing system of claim 1, where the shared cache is a system level cache.

7. The multi-chip data processing system of claim 1, where the caching agents includes level one (L1) and level two (L2) caching agents.

8. The multi-chip data processing system of claim 1, where the shared cache memory includes a level three (L3) cache, further comprising:

an eviction control register; and a cache controller configured to evict cache lines from the L3 cache based on an eviction policy, where the eviction of remote cache lines from the shared cache to a level four (L4) cache memory is enabled or disabled based on a content of the eviction control register.

9. The multi-chip data processing system of claim 8, where the L4 cache memory includes a remote cache memory.

10. A computer-implemented method comprising:

reading values of one or more cache configuration data stores;

configuring, based at least in part on the values of the one or more cache configuration data stores, a shared cache to have a first partition and a second partition, where the shared cache is shared between a plurality of local caching agents of a first chip of a multi-chip data processing system and is located on the first chip;

accessing, by one or more local caching agents of the plurality of local caching agents or a remote caching agent, local cache lines mapped to addresses in a first memory directly coupled to the first chip, where the first memory is a local memory of the first chip;

accessing, by the one or more local caching agents via a chip-chip link, remote cache lines mapped to addresses in a second memory directly coupled to a second chip of the multi-chip data processing system, where the second memory is a remote memory of the first chip;

storing the local cache lines in the first partition of the shared cache;

storing the remote cache lines in the second partition of the shared cache; and tracking and maintaining coherency of local and remote cache lines by a coherence manager located on the first chip.

11. The computer-implemented method of claim 10, further comprising:

storing a local cache line in the first partition of the shared cache when the local cache line is evicted from a local cache at a higher level than the shared cache; and storing a remote cache line in the second partition of the shared cache when the remote cache line is evicted from a local cache at a higher level than the shared cache.

12. The computer-implemented method of claim 10, further comprising programming the one or more cache configuration data stores responsive to execution of one or more user programming instructions.

13. The computer-implemented method of claim 10, further comprising:

monitoring access patterns of local memory and remote memory; and dynamically programming the one or more cache configuration data stores in response to the access patterns.

14. The computer-implemented method of claim 10, further comprising setting a size, maximum size or minimum size of the first partition based, at least in part, on values of the one more cache configuration data stores.

15. The computer-implemented method of claim 10, further comprising:

setting a maximum size of the first partition based, at least in part, on a value of a first cache configuration data store of the one or more cache configuration data stores; and setting a maximum size of the first partition based, at least in part, on a value of a first cache configuration data store of the one or more cache configuration data stores.

16. The computer-implemented method of claim 10, where the local caching agents include L1 and L2 caching agents.

17. The computer-implemented method of claim 10, further comprising:

reading a value of an eviction control register; and evicting a remote cache line from the shared cache;

enabling storage of the evicted remote cache line in a level four (L4) cache when the value of the eviction control register has a first value; and disabling storage of the evicted remote cache line in the L4 cache when the value of the eviction control register has a second value.

18. The computer-implemented method of claim 17, where the L4 cache includes a remote cache memory.

* * * * *